United States Patent
Yager et al.

(10) Patent No.: US 9,352,646 B2
(45) Date of Patent: May 31, 2016

(54) VEHICLE FUEL TANK

(75) Inventors: Jeff Yager, LaSalle (CA); Daniel Butum, West Bloomfield, MI (US); Kent T. Salvilla, Westland, MI (US); William Matthew Foster, White House, TN (US); Daniel Hall, Smyrna, TN (US); Billy L. Downey, Jr., Castalian Springs, TN (US)

(73) Assignee: YFS Automotive Systems, Inc, Troy, MI (US)

( * ) Notice: Subject to any disclaimer, the term of this patent is extended or adjusted under 35 U.S.C. 154(b) by 625 days.

(21) Appl. No.: 13/102,282

(22) Filed: May 6, 2011

(65) Prior Publication Data

US 2011/0272422 A1    Nov. 10, 2011

Related U.S. Application Data

(60) Provisional application No. 61/332,113, filed on May 6, 2010.

(51) Int. Cl.
*F16D 1/00*    (2006.01)
*B60K 15/03*    (2006.01)

(52) U.S. Cl.
CPC ....... *B60K 15/03* (2013.01); *B60K 2015/03256* (2013.01); *B60K 2015/03447* (2013.01); *B60K 2015/03467* (2013.01); *Y10T 403/7039* (2015.01)

(58) Field of Classification Search
CPC ............... B60K 15/03; B60K 2015/03447; B60K 2015/03467; B60K 2015/03256; Y10T 403/7039

USPC ............... 123/509; 220/297, 298, 301, 345.2; 285/203

See application file for complete search history.

(56) References Cited

U.S. PATENT DOCUMENTS

| 2,940,643 | A |   | 6/1960 | Olson |
|---|---|---|---|---|
| 3,172,365 | A |   | 3/1965 | Nasvytis |
| 3,232,644 | A | * | 2/1966 | Pfeifer et al. ................. 285/194 |
| 4,403,923 | A | * | 9/1983 | Korchin ........................ 417/360 |
| 4,449,737 | A | * | 5/1984 | Specht .............................. 285/7 |
| 4,756,638 | A | * | 7/1988 | Neyret .......................... 403/261 |
| 4,998,639 | A | * | 3/1991 | Seizert et al. ................. 141/368 |
| 5,083,583 | A |   | 1/1992 | Benjey |
| 5,308,427 | A |   | 5/1994 | Duhaime et al. |

(Continued)

FOREIGN PATENT DOCUMENTS

EP    0267666    5/1988
FR    2 663 991 A1    1/1992

(Continued)

OTHER PUBLICATIONS

PCT/CA2011/000523 International Search Report dated Aug. 8, 2011 (3 pages).

(Continued)

*Primary Examiner* — Fenn Mathew
*Assistant Examiner* — Robert Stodola
(74) *Attorney, Agent, or Firm* — Miller Canfield

(57) ABSTRACT

The inside wall of a fuel tank, and a sub-component are provided with locking means in the form of complementary formations that allow the sub-component to be coupled to the inside surface of the fuel tank wall. Interlocking of the complementary formations is achieved by moving the sub-component towards the wall providing angular movement to the sub-component relative to the fuel tank.

11 Claims, 5 Drawing Sheets

(56) References Cited

U.S. PATENT DOCUMENTS

| | | | |
|---|---|---|---|
| 6,058,963 A * | 5/2000 | Enge et al. | 137/202 |
| 6,408,979 B1 * | 6/2002 | Forbes et al. | 181/198 |
| 6,450,152 B1 * | 9/2002 | Everingham | 123/516 |
| 6,499,500 B2 * | 12/2002 | Rosseel | 137/15.17 |
| 6,584,996 B2 | 7/2003 | Spink | |
| 7,059,305 B2 | 6/2006 | Knaggs et al. | |
| 7,228,847 B2 | 6/2007 | Burke et al. | |
| 7,275,556 B2 * | 10/2007 | Frohwein | 137/15.17 |
| 7,290,675 B2 | 11/2007 | Gombert et al. | |
| 7,455,190 B2 | 11/2008 | Potter et al. | |
| 7,614,419 B2 * | 11/2009 | Minnick | 137/360 |
| 2002/0020705 A1 | 2/2002 | Vorenkamp et al. | |
| 2003/0094763 A1 * | 5/2003 | Benjey | 277/314 |
| 2005/0194796 A1 * | 9/2005 | Powell | 292/256 |
| 2006/0260129 A1 * | 11/2006 | Bergsma et al. | 29/890.124 |
| 2011/0139793 A1 * | 6/2011 | Park | 220/563 |

FOREIGN PATENT DOCUMENTS

| | | |
|---|---|---|
| GB | 2404175 | 1/2005 |
| WO | 03/053731 A1 | 7/2003 |
| WO | 2007093573 | 8/2007 |

OTHER PUBLICATIONS

Extended European Search Report and Opinion, received in European Patent Application No. 11777054.5, mailed Sep. 11, 2013 (6 pages).

* cited by examiner

VEHICLE FUEL TANK

CROSS-REFERENCE TO RELATED APPLICATION

This application claims benefit from U.S. provisional application No. 61/332,113 filed May 6, 2010 which is incorporated herein by reference in its entirety.

FIELD

This invention relates generally to fuel tanks for vehicles.

INTRODUCTION

Vehicle fuel systems must be leak tight under all conditions, and must ensure that the fuel received is moved safely through the fuel filler pipe to the fuel tank, and that the vapour generated during the filling process is moved to an appropriate onboard vapour storage container. Typically, fuel tanks will have various parts attached to the fuel tank shell in order to satisfy these requirements.

Fuel tanks are primarily made from either metal or plastic. The wall of a plastic fuel tank may comprise one or multiple layers, which may be designed with barrier properties to enhance the plastic fuel tank's ability to keep volatile organic compounds inside the tank.

An example of a part commonly attached to plastic vehicle fuel tanks is a gas vent valve, typically used to permit air to flow into the fuel tank as fuel is consumed from (and exits) the tank, and to further permit fuel vapour to flow from the fuel tank as fuel is loaded therein, during normal operation of the vehicle. In order to prevent fuel spillage when a vehicle is tipped or rolled, gas vent valves can be configured to close in response to a change in the orientation of the fuel tank.

A part is most commonly attached to a fuel tank shell by either welding, or mechanically attaching the part to the fuel tank. Example attachment methodologies advanced to date include those described in U.S. Pat. Nos. 5,083,583; 6,058,963; 6,584,996; 7,059,305; 7,228,847; 7,290,675; and, 7,455,190; and in U.S. Publication Nos. 2002/0020705 and 2006/0260129.

Conventionally, attaching a part to a fuel tank requires that a hole be cut into the tank body where the part is to be attached, which can significantly diminish the fuel tank barrier properties. An object of the present invention is to provide a means for attaching a part to the inside of a fuel tank without compromising the integrity of the tank wall.

SUMMARY

In one broad aspect, there is provided a fuel tank having a wall with an inside surface defining the interior of the tank, and locking means coupling a fuel tank sub-component to said inside surface of the wall without compromising the integrity of the wall, said locking means comprising complimentary male and female formations on said sub-component and said inside surface respectively, said formations being shaped to permit engagement of the formation on the sub-component with the formation on the wall by movement of the sub-component towards the wall and subsequent interlocking of said formations by angular movement of the sub-component with respect to the wall in a first direction.

The sub-component may be a valve or other part having a housing provided with locking formation(s), or the formation(s) may be on a separate housing that receives the part.

The part for mounting in the interior of the fuel tank may be, for example, a gas vent valve, a control valve, a fuel limit vent valve, baffles, a line retaining clip, or an internal retention clip. The housing of/for the part may have a vapour exit port and may be injection molded from a resilient material. In one embodiment, the material may be a plastic material selected from the group of: polyoxymethylene and polyphthalamide.

In one embodiment, the male formation is on the sub-component and may comprise a plurality of locking elements and a plurality of retention wings. Further, the female formation is on the inside surface of the fuel tank and may comprise a plurality of angled ramps for sliding engagement with the plurality of locking elements, a plurality of locking recesses for accepting the plurality of locking elements when the sub-component is coupled to the inside surface of the wall, and a plurality of undercut portions for engagement with the plurality of retention wings when the sub-component is coupled to the inside surface of the wall. More specifically, the plurality of angled ramps may comprise two diametrically opposed angled ramps.

In another embodiment, the fuel tank may further comprise alignment means aligning the sub-component within the fuel tank, said alignment means comprising a second set of complimentary male and female formations on the sub-component and the inside surface respectively, said second formations being shaped to permit alignment of the sub-component within the fuel tank prior to coupling.

The fuel tank may be manufactured by a method selected from the group of: stamping, hydro forming, blow molding, injection molding, and twin sheet vacuum forming.

In another broad aspect, there is provided a sub-component for coupling to an inside surface of a wall of a fuel tank without compromising the integrity of the wall, said sub-component comprising a formation shaped to engage with a complementary formation on the wall of the fuel tank by movement of the sub-component towards the wall and subsequent interlocking of said formations by angular movement of the sub-component with respect to the wall, said formations comprising male and female formations, respectively.

The sub-component may be a valve or other part having a housing provided with locking formation(s), or the formation(s) may be on a separate housing that receives the part.

The housing may be injection molded. In one embodiment, the housing may be a plastic material selected from the group of: polyoxymethylene and polyphthalamide. Further, the plastic material must be resistant to fuel.

The part for mounting in the interior of the fuel tank may be a gas vent valve, a control valve, a fuel limit vent valve, baffles, a line retaining clip, or an internal retention clip. The housing may have a vapour exit port and may be injection molded from a resilient material. In one embodiment, the material may be a plastic material selected from the group of: polyoxymethylene and polyphthalamide.

In one embodiment, the male formation is on the sub-component and may comprise a plurality of locking elements and a plurality of retention wings.

DRAWINGS

In order that the invention may be more clearly understood, reference will now be made to the accompanying drawings which illustrate a particular preferred embodiment of the invention by way of example, and in which.

DESCRIPTION OF VARIOUS EMBODIMENTS

Figure 1:
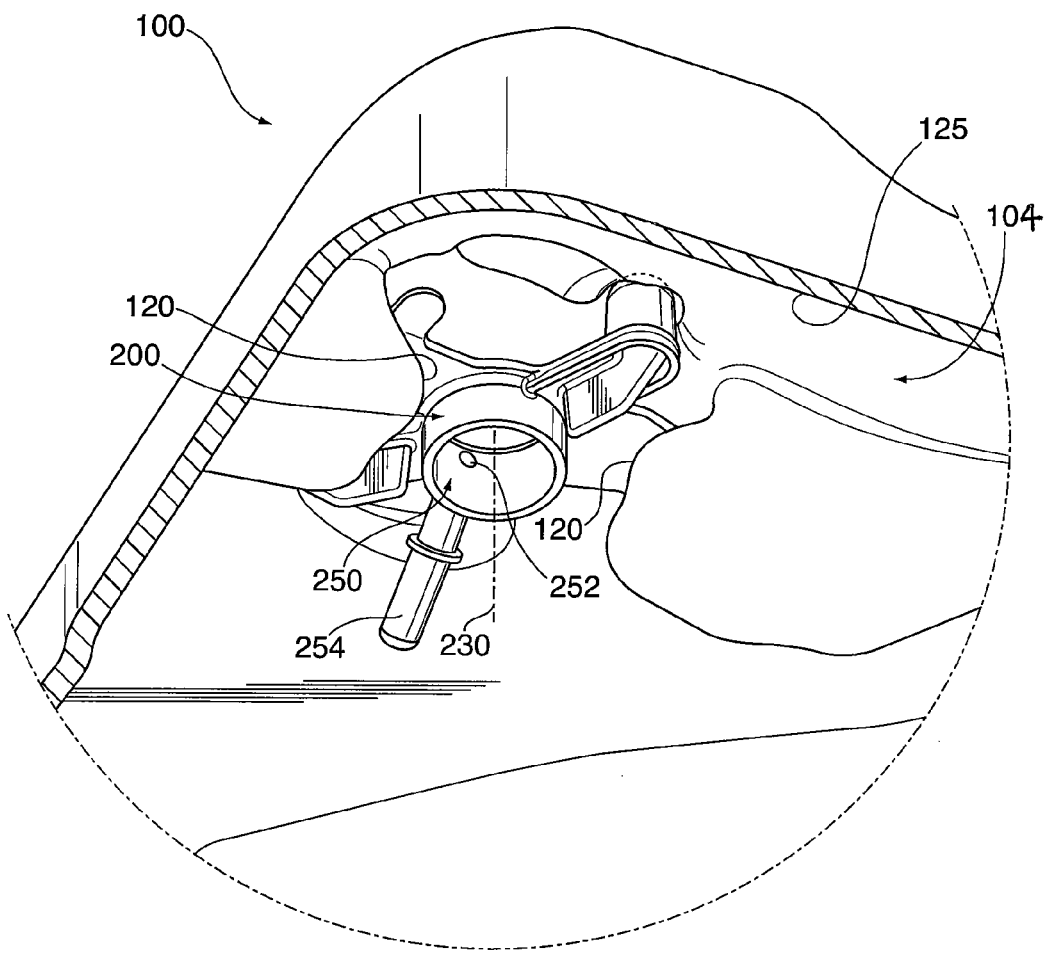
FIG. 1 is a perspective view of the inside of a fuel tank, the fuel tank having a sub-component coupled to an inside surface thereof.

Referring first to FIG. 1, a fuel tank designed for securing a fuel tank sub-component therein without compromising the integrity of the fuel tank wall is shown by way of example and is generally designated by reference numeral 100. Part of the fuel tank 100 has been cut away in order to show the interior thereof. A sub-component secured within the fuel tank 100 is shown in FIG. 1 by way of example and is generally designated by reference numeral 200. The sub-component 200 is attached to the inside wall 104 of the fuel tank 100 manually or using an automated process whereby an extended robot arm enters the fuel tank 100 through an opening to perform the attachment.

The fuel tank 100 is made of plastic, as is the sub-component 200, and the sub-component 200 is configured to house a valve (not shown). The sub-component 200 is coupled to the fuel tank 100 without compromising the surrounding inside surface 125 of the fuel tank 100 by providing a female formation on the inside surface 125 of the fuel tank 100 designed to engage with a complementary male formation provided on the sub-component 200. Throughout the description, reference may be made to complementary formations (or complementary design features) "on the fuel tank", or "provided on the fuel tank". Such references shall be understood to mean "on the inside surface of the fuel tank", or "provided on the inside surface of the fuel tank", respectively.

Figure 2:
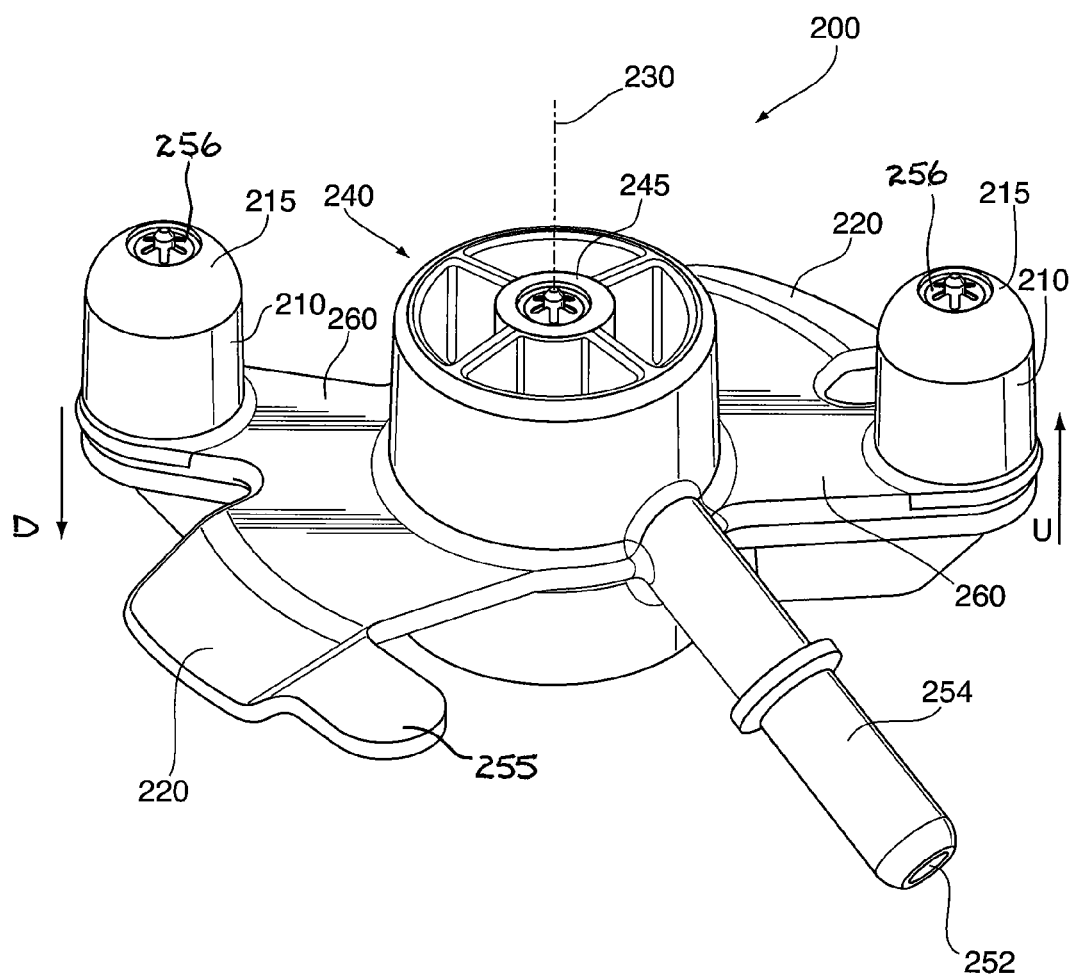
FIG. 2 is a perspective view of the sub-component of FIG. 1.

Referring now to FIG. 2, the sub-component 200 of FIG. 1 is shown in perspective view, in the absence of the fuel tank 100. As mentioned above, a male formation is provided to the sub-component 200 for engagement with a complementary female formation provided on the inside surface 125 of the fuel tank 100 (FIG. 1). The male formation comprises locking elements 210 and retention wings 220. The illustrated embodiment comprises two locking elements 210 and two retention wings 220 and functions similarly to a bayonet-style fitting (employing a twist to lock technique to secure the sub-component to the interior of the fuel tank). A person of ordinary skill in the art will appreciate that the sub-component 200 may be designed with a different number of locking elements 210 and retention wings 220.

Each locking element 210 is designed for engagement with a complementary recess (or pocket) of the inside wall 104 of the fuel tank 100 (FIG. 1). In the illustrated embodiment, the locking elements 210 are substantially cylindrical in shape and have a rounded contact portion 215 (i.e. a substantially hemispherical end portion). The contact portion 215 of the locking element 210 is the portion thereof (typically the end portion) configured for engagement with the complementary recess (or pocket) of the fuel tank 100 when coupling the sub-component 200 to the fuel tank 100 (FIG. 1). Those ordinarily skilled in the art will appreciate that the shape of the locking elements 210 may vary provided that the contact portions 215 are designed complementary to locking recesses formed in the fuel tank 100, which will be described further below. As will also be discussed further below, when the sub-component 200 is coupled to the inside wall 104 of the fuel tank 100, the contact portions 215 of the locking elements 210 engage with locking recesses on the fuel tank 100 (FIG. 1) to prevent rotation of the sub-component 200 about a central axis 230 thereof, and to restrict the sub-component's 200 mobility in the upward direction (indicated by the arrow labeled U).

The male formation provided to the sub-component 200 also comprises retention wings 220. In the illustrated embodiment, the sub-component 200 has two retention wings 220 substantially diametrically opposed. As mentioned above, the number of retention wings 220 provided to the sub-component 200 may be more or less than two. Further, it will be appreciated that where two retention wings 220 are used, they need not be substantially diametrically opposed. As will be discussed further below, when the sub-component 200 is coupled to the fuel tank 100 (FIG. 1), the retention wings 220 frictionally engage with complementary undercuts provided in the fuel tank 100 to restrict the sub-component's 200 mobility in the downward direction (indicated by the arrow labeled D).

The male formation provided to the sub-component 200 includes optional assembly fingers 255 in association with the retention wings 220. Each wing normally (but not necessarily) will be provided with an assembly finger. As discussed further below when the sub-component 200 is coupled to the fuel tank 100 (FIG. 1), the assembly fingers 255 are the first to engage the complementary undercuts provided in the fuel tank 100 and in effect guide the retention wings 200 to frictionally engage the complimentary undercut provided by the fuel tank 100.

Additionally, the sub-component 200 comprises an additional (or second) male formation shaped to permit alignment of the sub-component 200 within the fuel tank 100 when engaged with an additional (or second) female formation provided in the fuel tank 100 (FIG. 1). In the illustrated embodiment, the additional male formation of the sub-component 200 comprises the male locating element 240 protruding from the centre of the sub-component 200. The male locating element 240 is provided with a pivot surface 245, which when pressed against a complementary female formation in the fuel tank 100, indicates the proper positioning of the sub-component 200 for subsequent coupling to the fuel tank 100 (FIG. 1).

Figure 3:
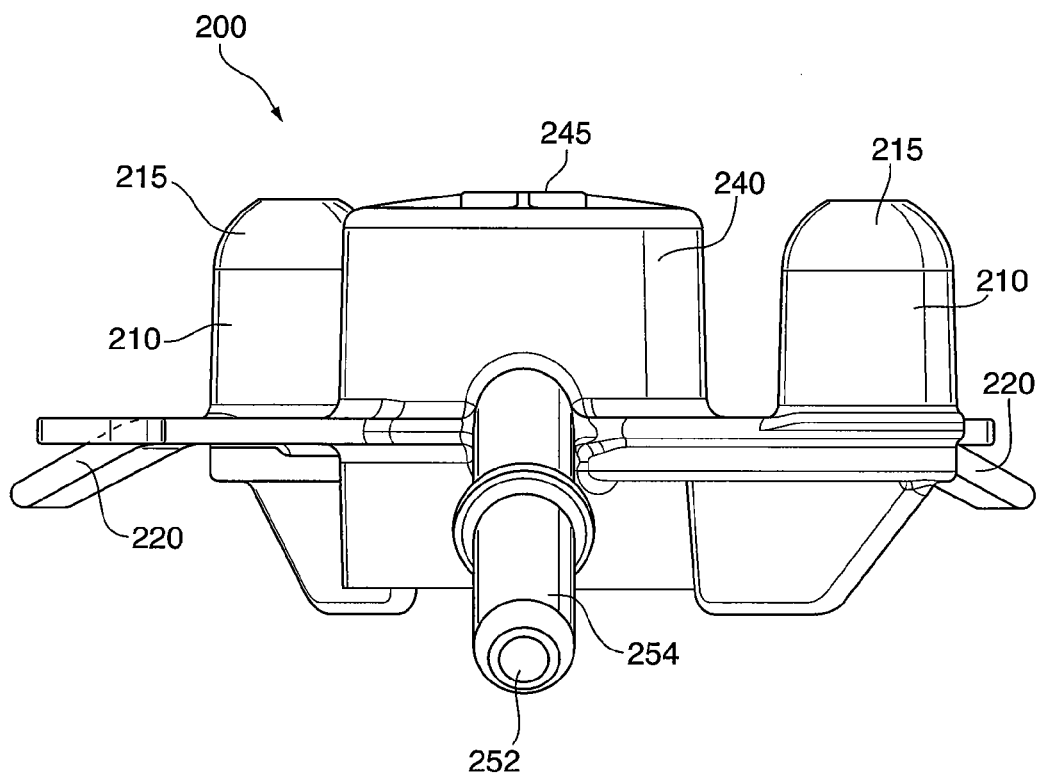
FIG. 3 is a side view of the sub-component of FIG. 1.

As seen in FIG. 3, the pivot surface 245 is planar and protrudes higher than the rest of the male locating element 240. Accordingly, the pivot surface 245 may provide the first point (or surface) of contact between the sub-component 200 and the fuel tank 100 when the latter is offered to the former for coupling. Further, the top surface of the male locating element 240 is beveled from the outer periphery of the pivot surface 245 to the outer periphery of the male locating element 240. As will be discussed further below, a complementary bevel is provided around a central locating surface of the fuel tank 100 (FIG. 1) to facilitate proper alignment of the sub-component 200 within the fuel tank 100 prior to, and during coupling.

With returning reference to FIG. 1, the sub-component 200 illustrated has an opening 250 for receiving a valve or other part (not shown) that is required to be attached inside a fuel tank 100. Examples of parts that may be required to be attached inside a fuel tank 100 include, but are not limited to, valves (e.g. gas vent valves, control valves, and fuel limit vent valves), baffles, line retaining clips, and internal retention clips. The sub-component 200 illustrated is exemplary only. It is designed for use with a separate gas vent valve (not shown) and has a vapour exit port 252 to allow fuel vapour to flow from the valve (not shown) to a desired location, e.g. an onboard vapour storage container (not shown), through a hollow vapour flow tube 254 of the sub-component 200. The area around opening 250 may be provided with a range of fastening means, such as mechanical, welds, adhesive, press-fit, rivets or screws. Within the opening may be threads, such as for holding a fuel system component in place. Seals may be provided, particularly where one of the alternate non-threaded fastening means are used.

Referring to FIG. 2, the sub-component 200 illustrated has two metal disks 256 installed one on the top of each of the diametrically opposed locking elements 210 and inside the rounded contact portion 215. A third metal disk is inserted into the pivot surface 245 on the male locating element 240. These disks allow for subsequent confirmation that the sub-component 200 is in the correct and final locked position during the assembly process.

Exemplary technologies for confirming correct location include metal detection, x-ray, and industrial imaging technology. In general, the technology used to locate the metal disks would verify proper location having regard to visual features (registration points) on the exterior surface of the tank, which may be either purposely placed registration points, or visual features that are already part of the tank itself.

As noted previously, instead of being a multiple-piece assembly (as in the illustrated embodiment), the sub-component 200 may be unitary wherein the locking formation(s) are integrally formed on the valve or other part itself. For example, the male formations of the sub-component 200, as described above, may be integrally formed on a housing of the valve.

As will be discussed in further detail below, an appropriate amount of resiliency is required of the sub-component 200. This resiliency may be achieved by injection-molding the sub-component 200 from certain plastic materials. The sub-component 200 must also be fuel resistant. In a preferred embodiment, the sub-component 200 may comprise either polyoxymethylene or polyphthalamide plastic with fuel-resistant properties.

Figure 4:
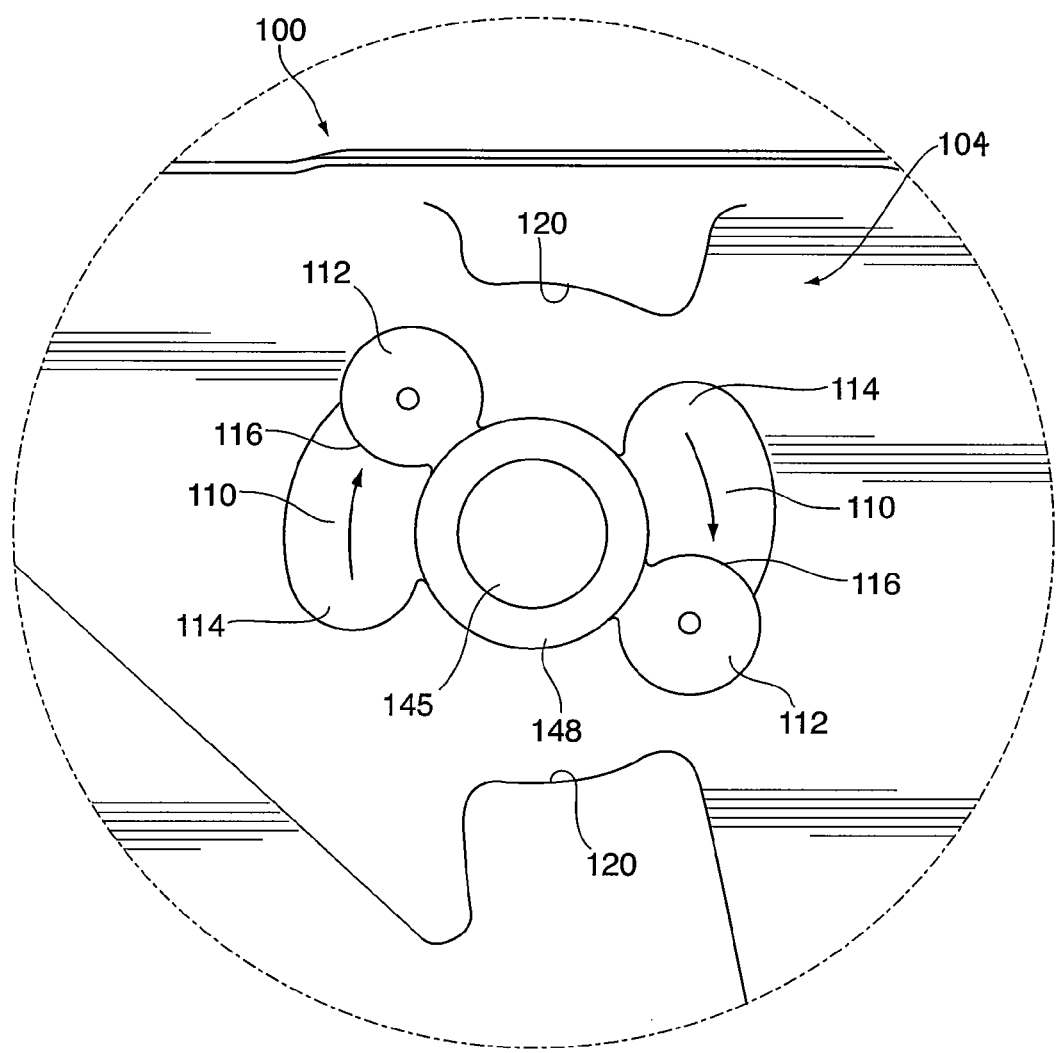
FIG. 4 is a bottom view of the inside of the fuel tank of FIG. 1.

Reference is now made to FIG. 4, in which a female formation of the inside wall 104 of the fuel tank 100 is illustrated by means of a bottom view of the cut away fuel tank 100 of FIG. 1, in the absence of sub-component 200. The female formation of the fuel tank 100 is complementary to the male formation of the sub-component 200 as described above, and may comprise angled ramps 110, locking recesses 112, and undercut portions 120.

In the embodiment illustrated, two locking recesses 112 are formed in the inside wall 104 of the fuel tank 100, as are the angled ramps 110 for sliding engagement with the locking elements 210 of the sub-component 200 (FIG. 2). The ramps 110 slope inward (i.e. towards the interior of the fuel tank 100) in the direction of the arrows, i.e. from a distal end 114 of the ramp 110 (furthest from the corresponding locking recess 112) towards the proximal end 116 of the ramp 110 (adjacent to the corresponding locking recess 112). In a preferred embodiment, the profile of each angled ramp 110 largely conforms to the profile of the contact portion 215 of the complementary locking element 210 of the sub-component 200, thereby facilitating sliding of the locking elements 210 along the angled ramps 110 in the direction of the arrows in FIG. 4. It will be appreciated that a different number of angled ramps 110 may be formed in the fuel tank 100 should a sub-component 200 with a different number of locking elements 210 be provided.

A locking recess 112 is formed in the inside wall 104 of the fuel tank 100 adjacent the proximal end 116 of each angled ramp 110. The locking recesses 112 are essentially hemispherical seats for receiving the locking elements 210 of the sub-component 200. The orientation of the locking recesses 112 relative to each other corresponds to the orientation of the locking elements 210 of the sub-component 200 relative to each other. For example, where the locking elements 210 of the sub-component 200 are diametrically opposed, the complementary locking recesses 112 in the fuel tank 100 will also be diametrically opposed. It will be appreciated that, as was the case with the number of angled ramps 110, more or less than two locking recesses 112 may be formed in the fuel tank 100 depending on the number of locking elements 210 provided on the sub-component 200. It will also be appreciated that the locking recesses 112 need not be hemispherical in shape; rather, they need only complement the shape of the locking elements 210 of the sub-component 200.

In the illustrated embodiment, the formation on the inside wall 104 of the fuel tank 100 further comprises undercut portions 120. As shown in FIG. 1, the undercut portions 120 may be formed by appropriately shaping the wall 104 of the fuel tank 100. The undercuts are appropriately oriented and spaced from the other components of the formation on the fuel tank 100 so as to be frictionally engaged first by the assembly fingers 255 and then the retention wings 220 of the sub-component 200 when the sub-component is coupled to the fuel tank 100. As apparent from FIG. 1, when the sub-component 200 is coupled to the fuel tank 100, the undercuts restrict the sub-component's 200 mobility by restricting its movement towards the center of the fuel tank 100.

With continuing reference to FIG. 4, an optional second female formation on the inside wall 104 of the fuel tank 100 is described. The second female formation provides alignment means for the sub-component 200 within the fuel tank 100 and comprises a central locating surface 145 for engagement with the complementary pivot surface of the sub-component 200 when the sub-component 200 is offered to the inside wall 104 of the fuel tank 100 prior to coupling. In a preferred embodiment, the central locating surface 145 of the fuel tank 100 conforms largely with the pivot surface 245 of the sub-component 200. For example, where the pivot surface 245 is planar (as in the embodiment of FIG. 3), the central locating surface of the fuel tank 100 is also planar. It will be appreciated by those skilled in the art that the central locating surface 145 and the pivot surface 245 are not required to be planar. For example, in some embodiments, the central locating surface and pivot surface may be conical in configuration. In the illustrated embodiment, the second female formation in the fuel tank 100 also comprises a beveled surface 148, largely conforming to the beveled top surface of the male locating element 240 between the periphery of the pivot surface 245 and the periphery of the top surface of the male locating element 240.

The female formations described above in connection with the inside surface wall 104 of the fuel tank 100 may be provided by blow molding the fuel tank 100 using an appropriately configured mold. Alternatively, the fuel tank 100 can be manufactured with the appropriate formations through stamping and hydro forming processes (for metal fuel tanks), and injection molding and twin sheet vacuum forming processes (for plastic fuel tanks).

Installation of the sub-component 200 within the fuel tank 100 is now described with reference to FIGS. 1, 2, and 4 to 7. The sub-component 200 is offered to the inside the wall 104 of the fuel tank 100 proximate the female formations provided therein (i.e. the sub-component 200 is moved towards the wall 104). Proper alignment of the sub-component 200 within the fuel tank 100 is achieved by pressing the pivot surface 245 of the sub-component 200 against the central locating surface 145 on the fuel tank 100. In the embodiment illustrated, the locking elements 210 are aligned with the distal ends 114 of the angled ramps 110 such that the retention wings 220 do not interfere with the undercuts 120. Pressure towards the wall 104 is applied to a portion of the sub-component 200 (typically a central portion), and the sub-component 200 is rotated (i.e. provided an angular movement) with respect to the first wall 104 to interlock the formation on the sub-component 200 with the formation on the fuel tank 100.

The sub-component 200 is turned in the direction indicated by the arrows in FIG. 4 such that the locking elements 210 slide up the angled ramps 110. By maintaining the applied pressure throughout the rotation of the sub-component 200, the angled ramps 110 increasingly displace the locking elements 210, causing the sub-component 200 to flex at the attachment regions 260 (FIG. 1) of the locking elements 210. Once the sub-component 200 is rotated such that the locking elements 210 reach the locking recesses 112, energy stored in the resilient material of the sub-component 200 causes the attachment members 260 to return to their natural (un-flexed) position and the locking elements 210 to snap into the locked position within the locking recesses 112. Once the sub-component 200 has reached this position, the retention wings 220 are engaged with the undercuts 120 and the sub-component 200 is effectively coupled to the wall 104 of the fuel tank 100, thereby immobilizing the sub-component 200 within the fuel tank 100 without compromising the integrity of the wall 104.

Figure 5:
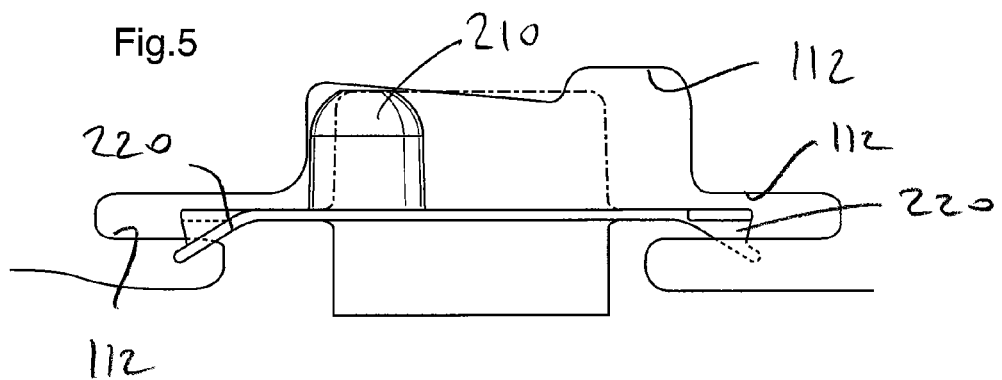
FIGS. 5, 6 and 7 are diagrammatic sequential views illustrating movement of the sub-component to a fully locked position within the fuel tank.
Figure 6:
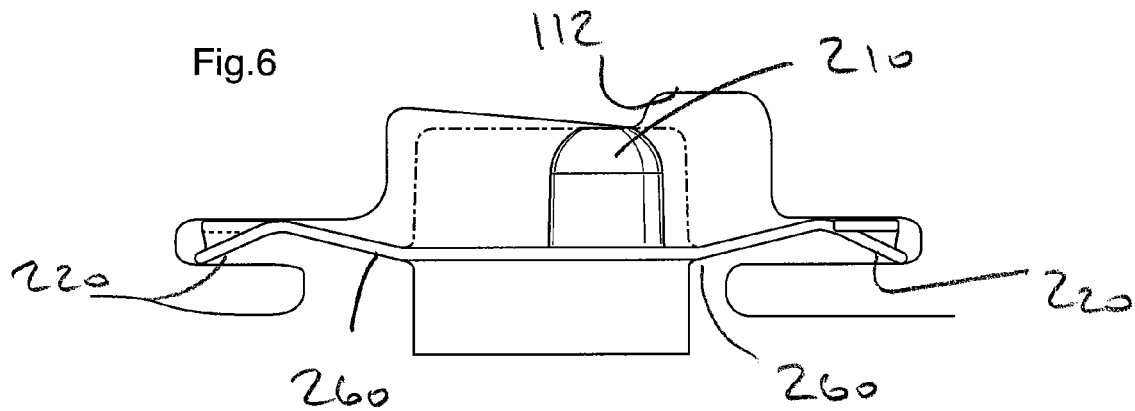
Figure 7:
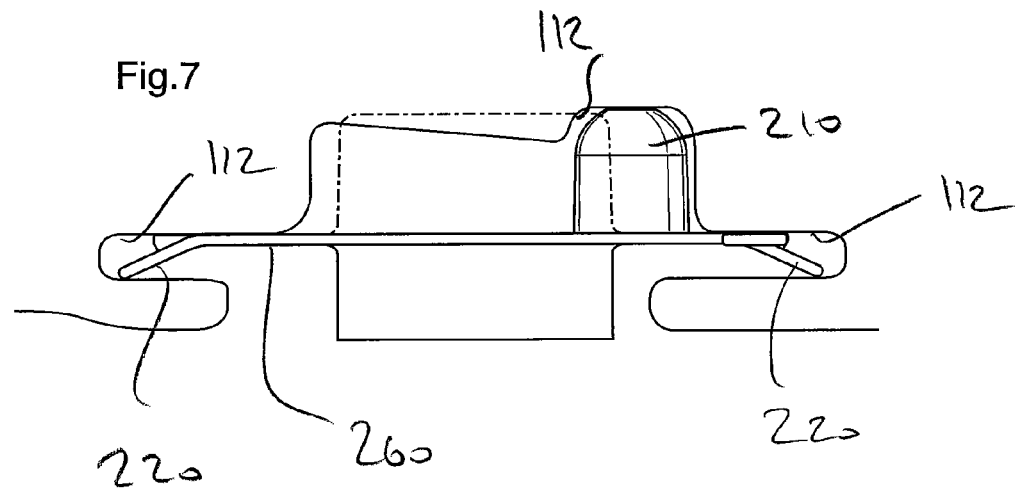

FIGS. 5, 6 and 7 are diagrammatic illustrations showing the sequence of movement of one of the locking element 210 into the corresponding locking recess 112. In FIG. 5, the retention wings 220 are shown prior to entering the corresponding undercuts 120 formed in the tank. In FIG. 6, the retention wings are within the respective undercuts and fully flexed at the attachment regions 260. In FIG. 7, the locking element 210 is seated within the associated recess 112 and the attachment regions 260 of the retention wings have partially relaxed.

It will of course be appreciated that the preceding description relates to a particular preferred embodiment of the invention and that many modifications are possible, some of which have been indicated above, and others of which will be apparent to a person skilled in the art. For example, the male and female formations of the fuel tank and sub-component may be interchanged (i.e. a male formation may be provided to the fuel tank and a complementary female formation may be provided to the sub-component).

Male locating element 240 may be a separately-formed piece that assembles on the main body portion comprising the retaining wings. For example, the male locating element 240 may be positioned in an opening of the main body portion, and is locked into place when the assembly is fitted to the corresponding female formations on the tank. While the sub-component is generally regarded as being a plastic component, other materials may be used including magnesium alloys (thixomolding), other metals such as aluminum using a die cast forming process and thermosetting materials.

Finally, it is to be noted that a plurality of sub-components may be used to attach a single part to a tank—for example, baffles may require multiple contact points within a tank.

The invention claimed is:

1. A fuel tank having a wall with an inside surface defining the interior of the tank and a fuel tank sub-component adapted to be coupled to said inside surface of the wall at a location in which the wall is free of openings that pass through the wall and without compromising the integrity of the wall;

the fuel tank comprising a plurality of spaced apart locking recesses formed in the wall of the fuel tank and a plurality of angled ramps, the ramps extending between a distal end spaced from an adjacent one of the locking recesses and a proximal end terminating at the adjacent one of the locking recesses, wherein each of the ramps slopes inwardly towards the interior of the fuel tank from the distal end to the proximal end; the fuel tank further comprising a plurality of undercut portions formed in the wall of the fuel tank, wherein the undercut portions are spaced between the locking recesses;

the subcomponent comprising a central male locating element defining a central axis, a plurality of spaced apart locking elements connected to the locating element by attachment regions projecting radially from the locating element, and a plurality of retention wings extending radially from the locating element and spaced between adjacent locking elements;

wherein the locking elements engage and slide along the angled ramps and are matingly received by the locking recesses and the retention wings are lockingly engaged with the undercut portions in response to rotation of the sub-component with respect to the wall of the fuel tank in a first direction to thereby interlock the sub-component to the fuel tank.

2. The fuel tank of claim 1, wherein the sub-component comprises a housing having an opening receiving a part for mounting in the interior of the fuel tank.

3. The fuel tank of claim 2, wherein the part is a valve.

4. The fuel tank of claim 3, wherein the valve is one of a gas vent valve, a control valve, and a fuel limit vent valve.

5. The fuel tank of claim 2, wherein the housing is injection molded.

6. The fuel tank of claim 2, wherein the housing comprises a plastic material selected from the group of: polyoxymethylene and polyphthalamide.

7. The fuel tank of claim 1, wherein the fuel tank further includes a central locating surface recessed in the wall of the fuel tank for receiving the male locating element of the sub-component to align the sub-component with the fuel tank along the central axis.

8. The fuel tank of claim 7, wherein the plurality of angled ramps comprises two diametrically opposed angled ramps.

9. The fuel tank of claim 1, wherein the fuel tank is manufactured by a method selected from the group of: stamping, hydro forming, blow molding, injection molding, and twin sheet vacuum forming.

10. The fuel tank of claim 7, wherein each retention wing is provided with an assembly finger extending circumferentially from the retention wing for engaging and guiding said retention wings into said undercut portions of said fuel tank in response to rotation of the sub-component relative to the fuel tank in the first direction.

11. A fuel tank as claimed in claim 1, wherein the sub-component is provided with at least one metal element that is detectable from externally of the fuel tank to confirm full engagement of the component with the fuel tank.

* * * * *